United States Patent [19]  [11] 4,353,443
Lombardo  [45] Oct. 12, 1982

[54] VEHICLE THROTTLE CONTROL

[76] Inventor: Richard S. R. Lombardo, 4425 20th St. W., Bradenton, Fla. 33507

[21] Appl. No.: 142,115

[22] Filed: Apr. 21, 1980

[51] Int. Cl.³ .............................................. B60K 41/20
[52] U.S. Cl. ...................................... 192/3 T; 74/502
[58] Field of Search .................. 192/3 T, 3 N; 74/502

[56] References Cited
U.S. PATENT DOCUMENTS

| | | | |
|---|---|---|---|
| 1,735,297 | 4/1930 | McKee | 74/502 |
| 2,531,216 | 11/1950 | Haver | 74/502 |
| 3,275,029 | 9/1966 | Wellman | 74/502 |
| 3,521,502 | 7/1970 | Houk | 74/502 |
| 3,900,087 | 8/1975 | Clare | 192/3 T |

Primary Examiner—Kenneth Dorner
Attorney, Agent, or Firm—Malin & Haley

[57] ABSTRACT

A manually operable motor vehicle throttle control device which is used to provide a speed control for the vehicle and which includes a manual override arm for releasing the throttle control to allow the throttle to return to the idle position. The device includes a threaded shaft connected to the accelerator pedal linkage (coupled to the carburetor) which includes a mateable, threaded shaft locking arm that is spring loaded which allows for both large and minute throttle adjustment setting (by pulling on the shaft or by rotating the shaft). The device is noncomplex in construction and may be readily installed in vehicles already manufactured. Brake override of the control is included.

2 Claims, 4 Drawing Figures

VEHICLE THROTTLE CONTROL

BACKGROUND OF THE INVENTION

This invention relates generally to a device that is mounted on or near the dashboard of a motor vehicle which includes a cable that connects to the accelerator pedal and throttle linkage of a vehicle. The device is manually actuated and allows for setting the throttle linkage of the vehicle at some point (greater than idle) so that the vehicle operator may drive the vehicle of a predetermined speed without having a depress the accelerator pedal.

There are many devices shown in the prior art which allow for cruise control that connect to the throttle linkage of a vehicle to alleviate the need to depress the accelerator pedal by the vehicle operator. These devices are characterized by extreme complexity in both structure and operation, and in many instances must be provided during the initial construction of the vehicle. Also, the devices shown in the prior art do not allow for both large scale and minute throttle adjustment and ready release during an emergency situation. None of the devices shown in the prior art illustrate a pivotally connected locking arm with teeth disposed on the bottom side.

The present invention overcomes the problems of the prior art by providing a relatively noncomplex structure that functions to provide manual speed setting of the throttle linkage of a motor vehicle.

BRIEF DESCRIPTION OF THE INVENTION

A device for providing a particular vehicle speed setting manually which includes a housing that may be mounted on a dashboard or in close proximity thereto, a threaded shaft having a knob fixed at one end to said shaft disposed through said housing, a cable connected to the throttle linkage of a motor vehicle and to said shaft by a swivel joint, and an override shaft locking arm pivotally connected to said housing, said arm having a singular or plurality of threaded members which engage said threaded shaft for locking said shaft in a longitudinal position relative to said housing. The locking arm is spring mounted to be held firmly in threaded engagement against the threaded control shaft.

To operate the device, one merely needs to pull longitudinally on the knob connected to the actuating shaft which tensions the throttle connected cable and pulls the throttle linkage allowing the shaft to be retracted until an approximate speed control position of the throttle is achieved. The spring-loaded locking arm will hold the shaft in this position. After the vehicle speed stabilizes, minute adjustment is possible by rotating the shaft in such a direction as to either tension or let out the throttle cable to achieve the exact speed desired. The actuating shaft has a swivel connector joint attached to the throttle cable so that the cable does not become twisted when the shaft is rotated. Since the threaded portions of the locking arm have threads which allow for rotation of the shaft, the shaft will readily move in or out by rotation.

To manually override the control device embodied in the instant invention, the vehicle operator need only lift the shaft locking arm, which disengages the threaded shaft, allowing the throttle to return to its minimum or idle position. Once this position is achieved, the device is in effect overridden and the speed control of the vehicle will be in its normal operational mode. When the vehicle operator is ready to reset the speed control, again he merely needs to pull the throttle control shaft against the spring tension of the throttle linkage. An additional override is provided by another cable attached to the shaft locking arm and the brake pedal so that the arm is lifted and disengaged from the control shaft whenever the brake pedal is depressed. To increase speed, as in passing another vehicle, the operator needs only to depress the accelerator pedal, and upon release of the pedal, the throttle will return to preset speed.

It is an object of this invention to provide an improved motor vehicle speed control which allows setting the throttle of the vehicle at a particular desired speed above the minimum throttle setting using both large and minute adjustments.

It is another object of this device to provide the vehicle speed control which is noncomplex in structure and operation, of increased efficiency, having reduced fabrication costs.

And yet, still another object of this invention is to provide a vehicle speed control which allows a vehicle operator to set the vehicle at a constant speed in alleviate the necessity of using the accelerator pedal but which includes a safety override feature which may be readily actuated by the vehicle operator to return the throttle setting to its minimum.

In accordance with these and other objects which will be apparent hereinafter, the instant invention will now be described with particular reference to the accompanying drawings.

PREFERRED EMBODIMENT OF THE INVENTION

Figure 1:
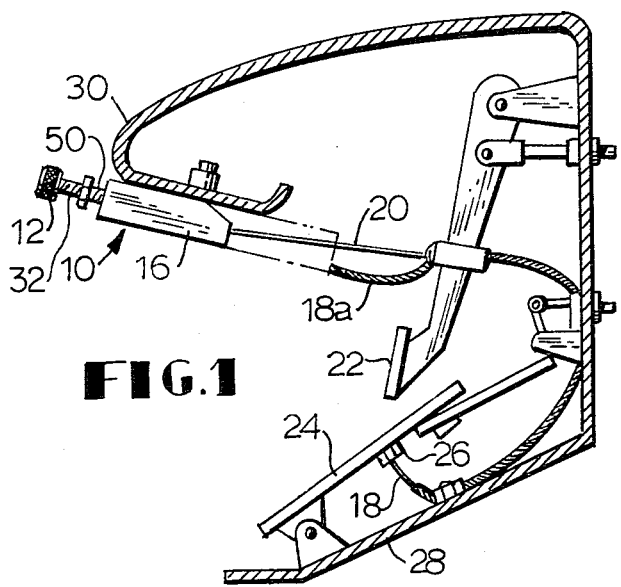
FIG. 1 shows a side elevational view of the instant invention in a vehicle.

Referring now to FIG. 1, the instant invention is shown generally at 10 as it would be installed in a vehicle and connected to dashboard 30. The invention 10 includes a housing 16 and a control shaft 32 having a knob 12 for actuation at one end and connected to a conventional two-part push-pull cable 18a. The inner slidable portion 18 of cable 18a is connected to a conventional accelerator pedal 24 mounted on the floorboard 28 of the vehicle. A brake pedal 22 is shown connected to cable 20 which is anchored to an override handle 14 which is described in greater detail below.

Figure 4:
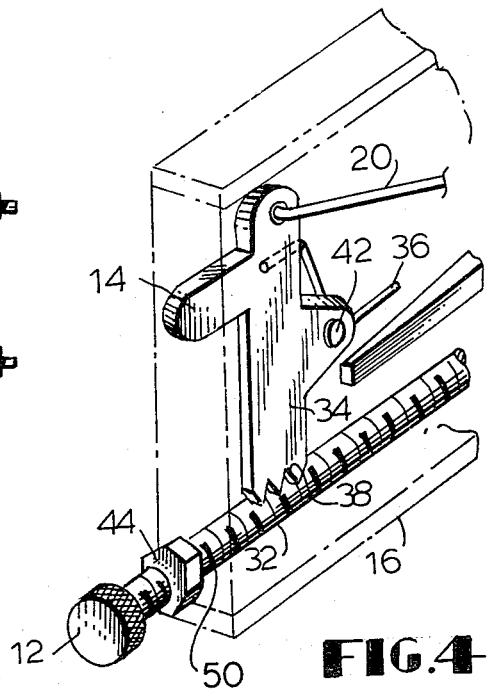
FIG. 4 shows a perspective fragmentary view of the instant invention.
Figure 2:
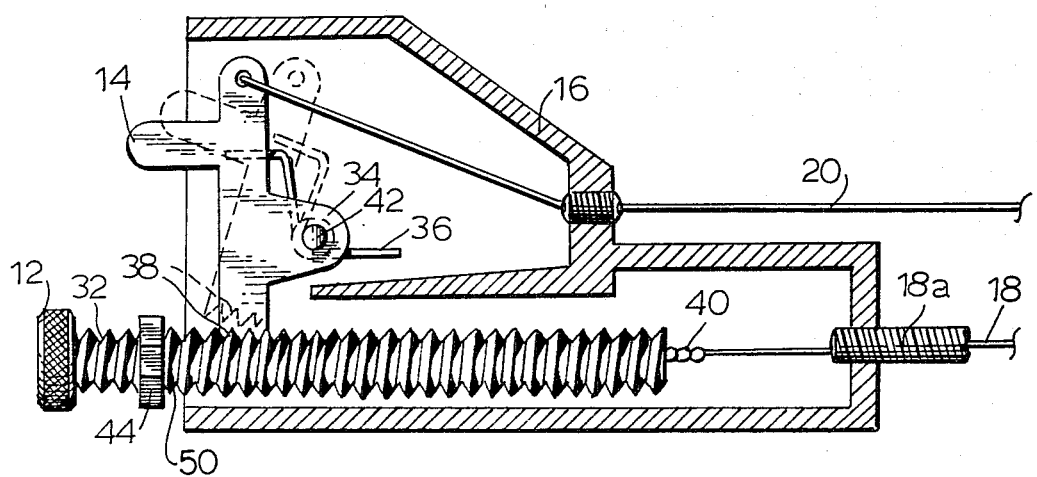
FIG. 2 shows a side elevational view partially cut away of the instant invention.

Referring now to FIGS. 2 and 4, the instant invention is shown having a housing 16 and a threaded shaft 32 mounted therein which is disposed along the housing and is connected to the inner portion 18 throttle linkage cable 18a by a swivel joint 40. The swivel joint 40 allows for rotation of shaft 32 by knob 12 without twisting cable inner part 18. Also mounted in a bifurcated portion of housing 16 is a shaft locking arm 34 having a singular or plurality of teeth 38 disposed at its bottom side. The shaft locking arm 34 is pivotally connected to the housing 16 by a pin 42. A torsion spring 36 engages the upper portion of the shaft locking arm 34 to hold the arm 34 in a biased position as shown. A manual handle 14 projects from the shaft locking arm 34 which allows a shaft locking arm to be lifted, disengaging threads 38 from shaft 32; allowing shaft 32 to resume a minimum position resting against bumper stop 44 located on said shaft. The cable inner portion 18 is connected to a conventional automobile accelerator pedal 24 as shown at 26 in FIG. 1.

Figure 3:
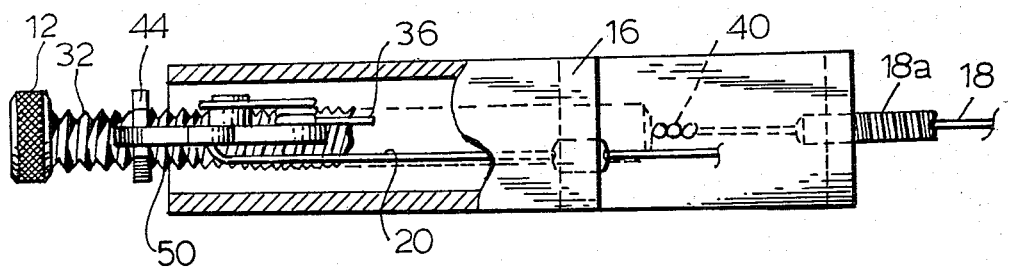
FIG. 3 shows a top plan view of the instant invention.

FIG. 3 shows the housing 16 and a cable 20, which connects to the brake pedal such that when the brake pedal is depressed, cable 20 will be tensioned raising the shaft locking arm, thereby disengaging the threaded teeth from the shaft, allowing the shaft to move longitudinally under the spring in an emergency situation. Merely the brake pedal tensions cable 20 which raises the locking arm 34, causing the shaft 32 to again be pulled inwardly effectively disengaging the device from the throttle linkage. With the use of the shaft locking plate 34 and its toothed portions which function to both lock the shaft 32 in a fixed position relative to the housing while at the same time allowing for rotation of the shaft, the device is capable of both large and small speed adjustment, while still allowing for complete override, either manually or by depressing the brake pedal.

Shaft 32 includes a consecutive series of speed index numbers or marks 50 which, when shaft 32 is pulled outward to engage this invention become visible, serving is indicia means for correlating displacement of shaft 32 with vehicle speed.

The instant invention has been shown and described herein in what is considered to be the most practical and preferred embodiment. It is recognized, however, that departures may be made therefrom within the scope of the invention and that obvious modifications will occur to a person skilled in the art.

What I claim is:

1. A device for setting the throttle linkage of a vehicle, the vehicle including a throttle, throttle linkage, an accelerator pedal, and a brake pedal, said device being useful for positioning the throttle linkage at a particular position for achieving cruise control of the vehicle such that the driver need not continuously depress the accelerator pedal, said device allowing for manual or brake pedal override of said throttle control, comprising:

a housing mountable to a portion of the vehicle at a location that is manually accessible by the driver of said vehicle, said housing including a hollow passage disposed between the front of said housing and the rear of said housing;

a rigid, threaded shaft mounted within the freely longitudinally and rotatably movable within said hollow passage of said housing;

a swiveling means connected to one end of said threaded shaft;

a cable connected at one end to said swiveling means and at the opposite end to said throttle linkage of said vehicle;

a manual grasping means disposed at the end of said threaded shaft opposite said swivel means and positioned outside of said housing, said manual grasping means being accessible and manually actuable by the driver of said vehicle;

a lever arm pivotally connected within said housing, said lever arm having a first portion having a toothed surface with at least one tooth that is engagable with said threaded shaft for locking said shaft at a predetermined position within said housing, said lever arm including a portion protruding from the front of said housing manually accessible by said driver, said lever arm being movable by manual actuation for disengaging said toothed surface from said threaded shaft, said threaded shaft being rotatable when engaged with said lever arm toothed surface for minute longitudinal adjustment of said throttle linkage cable; and a second cable, connected at one end to said lever arm and to said brake pedal at the opposite end of said second cable, said second cable being held in tension and its connection at one end to the lever arm at such a position on the lever arm such that depressing the brake pedal will cause the lever arm to be moved pivotally relative to said housing such that the toothed surface of said lever arm disengages said threaded shaft, unlocking said threaded shaft whereby the accelerator pedal and throttle linkage will thus be released from the tensioning of said threaded shaft.

2. A device for achieving cruise control of a vehicle as set forth in claim 1, wherein:

said shaft includes indicia means for correlating axial displacement of said shaft with the speed of the vehicle.

* * * * *